United States Patent
Treece et al.

(10) Patent No.: US 9,062,197 B2
(45) Date of Patent: Jun. 23, 2015

(54) POLYESTER BLENDS

(75) Inventors: Mark Allan Treece, Jonesborough, TN (US); Gary Michael Stack, Kingsport, TX (US); Daniel Henry Bolton, Kingsport, TN (US)

(73) Assignee: EASTMAN CHEMICAL COMPANY, Kingsport, TN (US)

( * ) Notice: Subject to any disclaimer, the term of this patent is extended or adjusted under 35 U.S.C. 154(b) by 957 days.

(21) Appl. No.: 12/728,565

(22) Filed: Mar. 22, 2010

(65) Prior Publication Data

US 2010/0249293 A1 Sep. 30, 2010

Related U.S. Application Data

(60) Provisional application No. 61/164,050, filed on Mar. 27, 2009.

(51) Int. Cl.
C08G 18/42 (2006.01)
C08L 67/00 (2006.01)
C08L 67/02 (2006.01)

(52) U.S. Cl.
CPC ..................................... C08L 67/02 (2013.01)

(58) Field of Classification Search
USPC ........................... 524/504, 539, 601; 525/418
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,249,652 A | 5/1966 | Quisenberry | |
| 3,864,428 A | 2/1975 | Nakamura et al. | |
| 4,096,202 A | 6/1978 | Farnham et al. | |
| 4,200,567 A | 4/1980 | Goldman et al. | |
| 4,263,364 A | 4/1981 | Seymour et al. | |
| 4,485,212 A | 11/1984 | Wefer | |
| 4,493,921 A | 1/1985 | Wefer | |
| 4,550,138 A | 10/1985 | Paddock et al. | |
| 5,382,628 A | 1/1995 | Stewart et al. | |
| 5,498,688 A | 3/1996 | Oshino et al. | |
| 5,654,347 A | 8/1997 | Khemani et al. | |
| 5,696,176 A | 12/1997 | Khemani et al. | |
| 5,705,575 A | 1/1998 | Kelsey | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 6,066,694 A * | 5/2000 | Chisholm et al. | 525/67 |
| 7,425,590 B2 | 9/2008 | Hale | |
| 7,462,684 B2 | 12/2008 | Hale et al. | |
| 7,510,768 B2 | 3/2009 | Crawford et al. | |
| 7,576,171 B2 | 8/2009 | Crawford et al. | |
| 7,704,605 B2 | 4/2010 | Crawford et al. | |
| 7,737,246 B2 | 6/2010 | Crawford | |
| 7,740,941 B2 | 6/2010 | Crawford et al. | |
| 7,781,562 B2 | 8/2010 | Crawford et al. | |
| 7,803,439 B2 | 9/2010 | Crawford et al. | |
| 7,803,440 B2 | 9/2010 | Crawford et al. | |
| 7,803,441 B2 | 9/2010 | Crawford et al. | |
| 7,807,774 B2 | 10/2010 | Crawford et al. | |
| 7,807,775 B2 | 10/2010 | Crawford et al. | |
| 7,812,111 B2 | 10/2010 | Crawford et al. | |
| 7,812,112 B2 | 10/2010 | Crawford et al. | |
| 7,834,129 B2 | 11/2010 | Crawford et al. | |
| 7,838,620 B2 | 11/2010 | Crawford et al. | |
| 7,842,776 B2 | 11/2010 | Crawford et al. | |
| 7,855,267 B2 | 12/2010 | Crawford et al. | |
| 7,868,128 B2 | 1/2011 | Crawford et al. | |
| 7,893,187 B2 | 2/2011 | Crawford et al. | |
| 7,893,188 B2 | 2/2011 | Crawford et al. | |
| 7,902,320 B2 | 3/2011 | Crawford et al. | |
| 7,906,211 B2 | 3/2011 | Crawford et al. | |
| 7,906,212 B2 | 3/2011 | Crawford et al. | |
| 7,906,610 B2 | 3/2011 | Crawford et al. | |
| 7,915,376 B2 | 3/2011 | Crawford et al. | |
| 7,951,900 B2 | 5/2011 | Crawford et al. | |
| 7,955,674 B2 | 6/2011 | Hale et al. | |
| 7,959,836 B2 | 6/2011 | Hale et al. | |
| 7,959,998 B2 | 6/2011 | Hale et al. | |
| 7,985,827 B2 | 7/2011 | Crawford et al. | |
| 8,063,172 B2 | 11/2011 | Crawford | |
| 8,063,173 B2 | 11/2011 | Crawford | |
| 8,067,525 B2 | 11/2011 | Crawford | |
| 8,101,705 B2 | 1/2012 | Crawford et al. | |
| 8,119,761 B2 | 2/2012 | Crawford et al. | |

(Continued)

FOREIGN PATENT DOCUMENTS

| | | |
|---|---|---|
| DE | 1221323 | 7/1966 |
| DE | 1694124 | 7/1971 |

(Continued)

OTHER PUBLICATIONS

U.S. Appl. No. 12/254,894, Gary Michael Stack et al., published on Apr. 22 2010.

U.S. Appl. No. 12/390,694, Gary Michael Stack, published on Dec. 31 2009.

Porter, Roger, et al., "Compatability and Transesterification in Binary Polymer Blends," Polymer 1992, pp. 2019-2030, vol. 33, #10.

Carrot, Christian, et al., "Immiscible Blends of PC and PET, Current Knowledge and New Results: Rheological Properties," Macromolecular Materials and Engineering, 2007, pp. 693-706, vol. 292.

(Continued)

Primary Examiner — Wenwen Cai

(57) ABSTRACT

Polyester blends comprising (1) polyesters prepared from terephthalic acid, 100 to 5 mol % of 2,2,4,4-tetramethyl-1,3-cyclobutanediol, and 0 to 95 mol % 1,4-cyclohexanedimethanol and (b) polyesters prepared from terephthalic acid and alkylene glycol. The blends may also contain an impact modifier and a phosphorous stabilizer. These blends can have a combination of thermal stability and toughness—making the materials useful in engineering molding plastics, packaging, films, and fibers.

15 Claims, 3 Drawing Sheets

(56) References Cited

U.S. PATENT DOCUMENTS

| | | |
|---|---|---|
| 8,119,762 B2 | 2/2012 | Crawford et al. |
| 8,133,967 B2 | 3/2012 | Pecorini et al. |
| 8,193,302 B2 | 6/2012 | Germroth et al. |
| 8,287,970 B2 | 10/2012 | Pecorini et al. |
| 8,299,204 B2 | 10/2012 | Germroth et al. |
| 8,354,491 B2 | 1/2013 | Crawford et al. |
| 2006/0226565 A1 | 10/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0286322 A1 | 12/2006 | Crawford et al. |
| 2006/0286326 A1 | 12/2006 | Crawford et al. |
| 2006/0286327 A1 | 12/2006 | Crawford et al. |
| 2006/0286328 A1 | 12/2006 | Crawford et al. |
| 2006/0286329 A1 | 12/2006 | Crawford et al. |
| 2006/0286330 A1 | 12/2006 | Crawford et al. |
| 2006/0286331 A1 | 12/2006 | Crawford et al. |
| 2006/0286384 A1 | 12/2006 | Crawford et al. |
| 2006/0286389 A1 | 12/2006 | Crawford et al. |
| 2006/0286394 A1 | 12/2006 | Crawford et al. |
| 2006/0287474 A1 | 12/2006 | Crawford et al. |
| 2006/0287476 A1 | 12/2006 | Crawford et al. |
| 2006/0287477 A1 | 12/2006 | Crawford et al. |
| 2006/0287478 A1 | 12/2006 | Crawford |
| 2006/0287479 A1 | 12/2006 | Crawford et al. |
| 2006/0287480 A1 | 12/2006 | Crawford |
| 2006/0287481 A1 | 12/2006 | Crawford et al. |
| 2006/0287482 A1 | 12/2006 | Crawford et al. |
| 2006/0287483 A1 | 12/2006 | Crawford et al. |
| 2006/0287484 A1 | 12/2006 | Crawford et al. |
| 2006/0287485 A1 | 12/2006 | Crawford et al. |
| 2006/0287486 A1 | 12/2006 | Crawford et al. |
| 2006/0287487 A1 | 12/2006 | Crawford et al. |
| 2006/0287488 A1 | 12/2006 | Crawford et al. |
| 2006/0287489 A1 | 12/2006 | Crawford et al. |
| 2006/0287490 A1 | 12/2006 | Crawford et al. |
| 2006/0287491 A1 | 12/2006 | Crawford et al. |
| 2006/0287492 A1 | 12/2006 | Crawford et al. |
| 2006/0287493 A1 | 12/2006 | Crawford et al. |
| 2006/0287494 A1 | 12/2006 | Crawford |
| 2006/0287495 A1 | 12/2006 | Crawford et al. |
| 2006/0287496 A1 | 12/2006 | Crawford et al. |
| 2006/0293494 A1 | 12/2006 | Crawford et al. |
| 2006/0293495 A1 | 12/2006 | Crawford et al. |
| 2007/0004813 A1* | 1/2007 | Shelby et al. ............... 521/134 |
| 2007/0010649 A1 | 1/2007 | Crawford et al. |
| 2007/0100122 A1 | 5/2007 | Crawford et al. |
| 2007/0100125 A1 | 5/2007 | Crawford et al. |
| 2007/0105993 A1 | 5/2007 | Germroth et al. |
| 2007/0106054 A1 | 5/2007 | Crawford et al. |
| 2007/0129531 A1 | 6/2007 | Germroth et al. |
| 2007/0142511 A1 | 6/2007 | Crawford |
| 2007/0142615 A1 | 6/2007 | Crawford |
| 2007/0232778 A1 | 10/2007 | Moody et al. |
| 2007/0232779 A1 | 10/2007 | Moody et al. |
| 2007/0270569 A1 | 11/2007 | Crawford et al. |
| 2008/0293857 A1 | 11/2008 | Crawford et al. |
| 2008/0293882 A1 | 11/2008 | Germroth et al. |
| 2009/0093573 A1 | 4/2009 | Germroth et al. |
| 2009/0093574 A1 | 4/2009 | Crawford et al. |
| 2009/0130353 A1 | 5/2009 | Pecorini et al. |
| 2009/0137723 A1 | 5/2009 | Crawford et al. |
| 2009/0137735 A1 | 5/2009 | Crawford et al. |
| 2010/0087574 A1 | 4/2010 | Crawford et al. |
| 2010/0092705 A1 | 4/2010 | Crawford et al. |
| 2010/0096589 A1 | 4/2010 | Crawford et al. |
| 2010/0120979 A1 | 5/2010 | Crawford |
| 2010/0159176 A1 | 6/2010 | Hale |
| 2010/0174030 A1 | 7/2010 | Crawford et al. |
| 2010/0174033 A1 | 7/2010 | Crawford et al. |
| 2010/0174034 A1 | 7/2010 | Crawford et al. |
| 2010/0184940 A1 | 7/2010 | Germroth et al. |
| 2010/0227971 A1 | 9/2010 | Crawford et al. |
| 2010/0298523 A1 | 11/2010 | Germroth et al. |
| 2010/0300918 A1 | 12/2010 | Crawford et al. |
| 2011/0017751 A1 | 1/2011 | Pecorini et al. |
| 2011/0042338 A1 | 2/2011 | Pecorini et al. |
| 2011/0054091 A1 | 3/2011 | Crawford et al. |
| 2011/0108503 A1 | 5/2011 | Crawford et al. |
| 2011/0144266 A1 | 6/2011 | Crawford et al. |
| 2011/0146022 A1 | 6/2011 | Crawford et al. |
| 2011/0189415 A1 | 8/2011 | Crawford et al. |
| 2011/0306730 A1 | 12/2011 | Crawford et al. |
| 2012/0021158 A1 | 1/2012 | Crawford et al. |
| 2012/0108715 A1 | 5/2012 | Crawford et al. |
| 2012/0184668 A1 | 7/2012 | Stack et al. |
| 2012/0184669 A1 | 7/2012 | Hale |
| 2012/0184687 A1 | 7/2012 | Hale et al. |
| 2012/0322951 A1 | 12/2012 | Hale et al. |
| 2012/0328815 A1 | 12/2012 | Pecorini et al. |

FOREIGN PATENT DOCUMENTS

| | | |
|---|---|---|
| EP | 0 169 947 | 2/1986 |
| JP | 51 034 991 | 3/1976 |

OTHER PUBLICATIONS

Nabar, Sanket, et al., "Rheology and Transesterification between Polycarbonate and Polyesters," Journal of Applied Polymer Science, 2007, pp. 2039-2047, vol. 104.

Gregory, D.R., et al., "Errors That Result from Thermal Degradation During Shear Measurements on Some Molten Polymers," Polymer Engineering and Science, 1985, pp. 362-366, vol. 25.

Kelsey, Donald R., et al., "High Impact, Amorphous Terephthalate Copolyesters of Rigid 2,2,4,4-Tetramethyl-1,3-Cyclobutanediol with Flexible Diols," Macromolecules, 2000, pp. 5810-5818, vol. 33, American Chemical Society.

Notice of Allowance and Fee(s) Due mailing date Jan. 24, 2013 received in co-pending U.S. Appl. No. 13/215,511.

Notice of Allowance and Fee(s) Due mailing date Nov. 23, 2012 received in co-pending U.S. Appl. No. 13/348,677.

USPTO Office Action dated Dec. 7, 2012 for co-pending U.S. Appl. No. 13/398,262.

USPTO Office Action dated Apr. 23, 2013 for co-pending U.S. Appl. No. 13/097,722.

\* cited by examiner

POLYESTER BLENDS

CROSS REFERENCE TO RELATED APPLICATIONS

This application claims the benefit of U.S. Provisional Application Ser. No. 61/164,050, filed Mar. 27, 2009, the disclosure of which is incorporated herein by reference in its entirety.

FIELD OF THE INVENTION

The present invention generally relates to polymer blends comprising polyesters made from terephthalic acid; 2,2,4,4-tetramethyl-1,3-cyclobutanediol; and 1,4-cyclohexanedimethanol; and polyalkylene terephthalate. The blends are characterized by a unique combination of properties such as thermal stability and toughness. The blends can be formed into, for example, molded articles, films, and fibers.

BACKGROUND OF THE INVENTION

Polymer blends are mixtures of structurally different polymers or copolymers. Commercially important polymer blends are generally mechanical mixtures, which are made by melt blending the various polymers in an extruder or other suitable intensive mixer. Most polymer-blend pairs form immiscible two-phase structures. For miscible systems, properties close to additive, relative to the properties of the neat polymers, are typically obtained. For immiscible systems, however, the two-phase structure can result in toughness properties somewhat lower than would be predicted from simple additivity.

Multi-component polyester blends (e.g., polycarbonate/PET blends) tend to have poor thermal stability in the molten state. Part of this instability is due to the tendency of the blend components to undergo transesterification in the melt. This reaction can result in gas evolution, changes in melt viscosity, and if one of the polyesters is crystalline, a reduction in both the degree of crystallinity and the crystalline melting point.

Thus, there is a need in the art for polyester blends with improved toughness and thermal stability, and a higher degree of crystallinity and melting point. The present invention addresses this need as well as others that will become apparent from the following description and claims.

SUMMARY OF THE INVENTION

In one embodiment, the invention provides a polyester blend comprising:
  (a) 5 to 95 weight percent of a polyester (A) comprising:
    (i) a dicarboxylic acid portion comprising residues of terephthalic acid, isophthalic acid, or both; and
    (ii) a glycol portion comprising 5 to 100 mole percent of 2,2,4,4-tetramethyl-1,3-cyclobutanediol residues and 0 to 95 mole percent of 1,4-cyclohexanedimethanol residues; and
  (b) 5 to 95 weight percent of a polyester (B) comprising a polyalkylene terephthalate;
  wherein for each of polyester (A) and polyester (B), the total mole % of the dicarboxylic acid portion is 100 mole %, and the total mole % of the glycol portion is 100 mole %; and
  wherein the total weight percentage of the blend equals 100 weight percent.

For the purposes of this invention, polyester (A) refers to the polyester containing TMCD and polyester (B) refers to polyalkylene terephthalate (PAT).

In another embodiment, the invention provides a polyester blend comprising:
  (a) 15 to 80 weight percent of a polyester (A) comprising:
    (i) a dicarboxylic acid portion comprising 90 to 100 mole percent of residues of terephthalic acid, isophthalic acid, or both; and
    (ii) a glycol portion comprising 5 to 95 mole percent of 2,2,4,4-tetramethyl-1,3-cyclobutanediol residues and 5 to 95 mole percent of 1,4-cyclohexanedimethanol residues;
  (b) 20 to 85 weight percent of polyester (B) comprising a polyethylene terephthalate;
  (c) 2 to 10 weight percent of an impact modifier; and
  (d) 0 to 1 weight percent of a phosphorus stabilizer.

In one embodiment, the invention provides a polyester blend comprising:
  (a) 20 to 80 weight percent of a polyester (A) comprising:
    (i) a dicarboxylic acid portion comprising residues of terephthalic acid, isophthalic acid, or both; and
    (ii) a glycol portion comprising 5 to 100 mole percent of 2,2,4,4-tetramethyl-1,3-cyclobutanediol residues and 0 to 95 mole percent of 1,4-cyclohexanedimethanol residues; and
  (b) 20 to 80 weight percent of a polyester (B) comprising a polyalkylene terephthalate;
  wherein for each of polyester (A) and polyester (B), the total mole % of the dicarboxylic acid portion is 100 mole %, and the total mole % of the glycol portion is 100 mole %; and
  wherein the total weight percentage of the blend equals 100 weight percent.

In one embodiment, the invention provides a polyester blend comprising:
  (a) 30 to 85 weight percent of a polyester (A) comprising:
    (i) a dicarboxylic acid portion comprising residues of terephthalic acid, isophthalic acid, or both; and
    (ii) a glycol portion comprising 5 to 100 mole percent of 2,2,4,4-tetramethyl-1,3-cyclobutanediol residues and 0 to 95 mole percent of 1,4-cyclohexanedimethanol residues; and
  (b) 15 to 70 weight percent of a polyester (B) comprising a polyalkylene terephthalate;
  wherein for each of polyester (A) and polyester (B), the total mole % of the dicarboxylic acid portion is 100 mole %, and the total mole % of the glycol portion is 100 mole %; and
  wherein the total weight percentage of the blend equals 100 weight percent.

In one embodiment, the invention provides a polyester blend comprising:
  (a) 50 to 85 weight percent of a polyester (A) comprising:
    (i) a dicarboxylic acid portion comprising residues of terephthalic acid, isophthalic acid, or both; and
    (ii) a glycol portion comprising 5 to 100 mole percent of 2,2,4,4-tetramethyl-1,3-cyclobutanediol residues and 0 to 95 mole percent of 1,4-cyclohexanedimethanol residues; and
  (b) 15 to 50 weight percent of a polyester (B) comprising a polyalkylene terephthalate;
  wherein for each of polyester (A) and polyester (B), the total mole % of the dicarboxylic acid portion is 100 mole %, and the total mole % of the glycol portion is 100 mole %; and
  wherein the total weight percentage of the blend equals 100 weight percent.

In one embodiment, the invention provides a polyester blend comprising:
  (a) 5 to 95 weight percent of a polyester (A) comprising:
    (i) a dicarboxylic acid portion comprising residues of terephthalic acid, isophthalic acid, or both; and (ii) a glycol portion comprising 5 to 50 mole percent of 2,2,4,4-tetramethyl-1,3-cyclobutanediol residues and 50 to 95 mole percent of 1,4-cyclohexanedimethanol residues; and (b) 5 to 95 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In another embodiment, the invention provides a polyester blend comprising:

(a) 15 to 80 weight percent of a polyester (A) comprising:
(i) a dicarboxylic acid portion comprising 90 to 100 mole percent of residues of terephthalic acid, isophthalic acid, or both; and
(ii) a glycol portion comprising 5 to 50 mole percent of 2,2,4,4-tetramethyl-1,3-cyclobutanediol residues and 50 to 95 mole percent of 1,4-cyclohexanedimethanol residues;

(b) 20 to 85 weight percent of polyester (B) comprising a polyethylene terephthalate;

(c) 2 to 10 weight percent of an impact modifier; and (d) 0 to 1 weight percent of a phosphorus stabilizer.

In one embodiment, the invention provides a polyester blend comprising:

(a) 20 to 80 weight percent of a polyester (A) comprising:
(i) a dicarboxylic acid portion comprising residues of terephthalic acid, isophthalic acid, or both; and
(ii) a glycol portion comprising 5 to 50 mole percent of 2,2,4,4-tetramethyl-1,3-cyclobutanediol residues and 50 to 95 mole percent of 1,4-cyclohexanedimethanol residues; and (b) 20 to 80 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:

(a) 30 to 85 weight percent of a polyester (A) comprising:
(i) a dicarboxylic acid portion comprising residues of terephthalic acid, isophthalic acid, or both; and
(ii) a glycol portion comprising 5 to 50 mole percent of 2,2,4,4-tetramethyl-1,3-cyclobutanediol residues and 50 to 95 mole percent of 1,4-cyclohexanedimethanol residues; and (b) 15 to 70 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:

(a) 50 to 85 weight percent of a polyester (A) comprising:
(i) a dicarboxylic acid portion comprising residues of terephthalic acid, isophthalic acid, or both; and
(ii) a glycol portion comprising 5 to 50 mole percent of 2,2,4,4-tetramethyl-1,3-cyclobutanediol residues and 50 to 95 mole percent of 1,4-cyclohexanedimethanol residues; and (b) 15 to 50 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:

(a) 5 to 95 weight percent of a polyester (A) comprising:
(i) a dicarboxylic acid portion comprising residues of terephthalic acid, isophthalic acid, or both; and
(ii) a glycol portion comprising 15 to 50 mole percent of 2,2,4,4-tetramethyl-1,3-cyclobutanediol residues and 50 to 85 mole percent of 1,4-cyclohexanedimethanol residues; and (b) 5 to 95 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In another embodiment, the invention provides a polyester blend comprising:

(a) 15 to 80 weight percent of a polyester (A) comprising:
(i) a dicarboxylic acid portion comprising 90 to 100 mole percent of residues of terephthalic acid, isophthalic acid, or both; and
(ii) a glycol portion comprising 15 to 50 mole percent of 2,2,4,4-tetramethyl-1,3-cyclobutanediol residues and 50 to 85 mole percent of 1,4-cyclohexanedimethanol residues;

(b) 20 to 85 weight percent of polyester (B) comprising a polyethylene terephthalate;

(c) 2 to 10 weight percent of an impact modifier; and (d) 0 to 1 weight percent of a phosphorus stabilizer.

In one embodiment, the invention provides a polyester blend comprising:

(a) 20 to 80 weight percent of a polyester (A) comprising:
(i) a dicarboxylic acid portion comprising residues of terephthalic acid, isophthalic acid, or both; and
(ii) a glycol portion comprising 15 to 50 mole percent of 2,2,4,4-tetramethyl-1,3-cyclobutanediol residues and 50 to 85 mole percent of 1,4-cyclohexanedimethanol residues; and (b) 20 to 80 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:

(a) 30 to 85 weight percent of a polyester (A) comprising:
(i) a dicarboxylic acid portion comprising residues of terephthalic acid, isophthalic acid, or both; and
(ii) a glycol portion comprising 15 to 50 mole percent of 2,2,4,4-tetramethyl-1,3-cyclobutanediol residues and 50 to 85 mole percent of 1,4-cyclohexanedimethanol residues; and (b) 15 to 70 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:
(a) 50 to 85 weight percent of a polyester (A) comprising:
  (i) a dicarboxylic acid portion comprising residues of terephthalic acid, isophthalic acid, or both; and
  (ii) a glycol portion comprising 15 to 40 mole percent of 2,2,4,4-tetramethyl-1,3-cyclobutanediol residues and 60 to 85 mole percent of 1,4-cyclohexanedimethanol residues; and
(b) 15 to 50 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In another embodiment, the invention provides a polyester blend comprising:
(a) 15 to 80 weight percent of a polyester (A) comprising:
  (i) a dicarboxylic acid portion comprising 90 to 100 mole percent of residues of terephthalic acid, isophthalic acid, or both; and
  (ii) a glycol portion comprising 15 to 40 mole percent of 2,2,4,4-tetramethyl-1,3-cyclobutanediol residues and 60 to 85 mole percent of 1,4-cyclohexanedimethanol residues;
(b) 20 to 85 weight percent of polyester (B) comprising a polyethylene terephthalate;
(c) 2 to 10 weight percent of an impact modifier; and
(d) 0 to 1 weight percent of a phosphorus stabilizer.

In one embodiment, the invention provides a polyester blend comprising:
(a) 20 to 80 weight percent of a polyester (A) comprising:
  (i) a dicarboxylic acid portion comprising residues of terephthalic acid, isophthalic acid, or both; and
  (ii) a glycol portion comprising 15 to 40 mole percent of 2,2,4,4-tetramethyl-1,3-cyclobutanediol residues and 60 to 85 mole percent of 1,4-cyclohexanedimethanol residues; and
(b) 20 to 80 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 30 to 85 weight percent of a polyester (A) comprising:
  (i) a dicarboxylic acid portion comprising residues of terephthalic acid, isophthalic acid, or both; and
  (ii) a glycol portion comprising 15 to 40 mole percent of 2,2,4,4-tetramethyl-1,3-cyclobutanediol residues and 60 to 85 mole percent of 1,4-cyclohexanedimethanol residues; and
(b) 15 to 70 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 50 to 85 weight percent of a polyester (A) comprising:
  (i) a dicarboxylic acid portion comprising residues of terephthalic acid, isophthalic acid, or both; and
  (ii) a glycol portion comprising 15 to 40 mole percent of 2,2,4,4-tetramethyl-1,3-cyclobutanediol residues and 60 to 85 mole percent of 1,4-cyclohexanedimethanol residues; and
(b) 15 to 50 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In another embodiment, the invention provides a polyester blend comprising:
(a) 15 to 80 weight percent of a polyester (A) comprising:
  (i) a dicarboxylic acid portion comprising 90 to 100 mole percent of residues of terephthalic acid, isophthalic acid, or both; and
  (ii) a glycol portion comprising 20 to 40 mole percent of 2,2,4,4-tetramethyl-1,3-cyclobutanediol residues and 60 to 80 mole percent of 1,4-cyclohexanedimethanol residues;
(b) 20 to 85 weight percent of polyester (B) comprising a polyethylene terephthalate;
(c) 2 to 10 weight percent of an impact modifier; and
(d) 0 to 1 weight percent of a phosphorus stabilizer.

In one embodiment, the invention provides a polyester blend comprising:
(a) 20 to 80 weight percent of a polyester (A) comprising:
  (i) a dicarboxylic acid portion comprising residues of terephthalic acid, isophthalic acid, or both; and
  (ii) a glycol portion comprising 20 to 40 mole percent of 2,2,4,4-tetramethyl-1,3-cyclobutanediol residues and 60 to 80 mole percent of 1,4-cyclohexanedimethanol residues; and
(b) 20 to 80 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 30 to 85 weight percent of a polyester (A) comprising:
  (i) a dicarboxylic acid portion comprising residues of terephthalic acid, isophthalic acid, or both; and
  (ii) a glycol portion comprising 20 to 40 mole percent of 2,2,4,4-tetramethyl-1,3-cyclobutanediol residues and 60 to 80 mole percent of 1,4-cyclohexanedimethanol residues; and
(b) 15 to 70 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 50 to 85 weight percent of a polyester (A) comprising:
  (i) a dicarboxylic acid portion comprising residues of terephthalic acid, isophthalic acid, or both; and (ii) a glycol portion comprising 20 to 40 mole percent of 2,2,4,4-tetramethyl-1,3-cyclobutanediol residues and 60 to 80 mole percent of 1,4-cyclohexanedimethanol residues; and
(b) 15 to 50 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In another embodiment, the invention provides a polyester blend comprising:
(a) 15 to 80 weight percent of a polyester (A) comprising:
(i) a dicarboxylic acid portion comprising 90 to 100 mole percent of residues of terephthalic acid, isophthalic acid, or both; and
(ii) a glycol portion comprising 20 to 30 mole percent of 2,2,4,4-tetramethyl-1,3-cyclobutanediol residues and 70 to 80 mole percent of 1,4-cyclohexanedimethanol residues;
(b) 20 to 85 weight percent of polyester (B) comprising a polyethylene terephthalate;
(c) 2 to 10 weight percent of an impact modifier; and
(d) 0 to 1 weight percent of a phosphorus stabilizer.

In one embodiment, the invention provides a polyester blend comprising:
(a) 20 to 80 weight percent of a polyester (A) comprising:
(i) a dicarboxylic acid portion comprising residues of terephthalic acid, isophthalic acid, or both; and
(ii) a glycol portion comprising 20 to 30 mole percent of 2,2,4,4-tetramethyl-1,3-cyclobutanediol residues and 70 to 80 mole percent of 1,4-cyclohexanedimethanol residues; and
(b) 20 to 80 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 30 to 85 weight percent of a polyester (A) comprising:
(i) a dicarboxylic acid portion comprising residues of terephthalic acid, isophthalic acid, or both; and
(ii) a glycol portion comprising 20 to 30 mole percent of 2,2,4,4-tetramethyl-1,3-cyclobutanediol residues and 70 to 80 mole percent of 1,4-cyclohexanedimethanol residues; and
(b) 15 to 70 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 50 to 85 weight percent of a polyester (A) comprising:
(i) a dicarboxylic acid portion comprising residues of terephthalic acid, isophthalic acid, or both; and
(ii) a glycol portion comprising 20 to 30 mole percent of 2,2,4,4-tetramethyl-1,3-cyclobutanediol residues and 70 to 80 mole percent of 1,4-cyclohexanedimethanol residues; and
(b) 15 to 50 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In another embodiment, the invention provides a polyester blend comprising:
(a) 15 to 80 weight percent of a polyester (A) comprising:
(i) a dicarboxylic acid portion comprising 90 to 100 mole percent of residues of terephthalic acid, isophthalic acid, or both; and
(ii) a glycol portion comprising 30 to 40 mole percent of 2,2,4,4-tetramethyl-1,3-cyclobutanediol residues and 60 to 70 mole percent of 1,4-cyclohexanedimethanol residues;
(b) 20 to 85 weight percent of polyester (B) comprising a polyethylene terephthalate;
(c) 2 to 10 weight percent of an impact modifier; and
(d) 0 to 1 weight percent of a phosphorus stabilizer.

In one embodiment, the invention provides a polyester blend comprising:
(a) 20 to 80 weight percent of a polyester (A) comprising:
(i) a dicarboxylic acid portion comprising residues of terephthalic acid, isophthalic acid, or both; and
(ii) a glycol portion comprising 30 to 40 mole percent of 2,2,4,4-tetramethyl-1,3-cyclobutanediol residues and 60 to 70 mole percent of 1,4-cyclohexanedimethanol residues; and
(b) 20 to 80 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 30 to 85 weight percent of a polyester (A) comprising:
(i) a dicarboxylic acid portion comprising residues of terephthalic acid, isophthalic acid, or both; and
(ii) a glycol portion comprising 30 to 40 mole percent of 2,2,4,4-tetramethyl-1,3-cyclobutanediol residues and 60 to 70 mole percent of 1,4-cyclohexanedimethanol residues; and
(b) 15 to 70 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and
wherein the total weight percentage of the blend equals 100 weight percent.

In one embodiment, the invention provides a polyester blend comprising:
(a) 45 to 80 weight percent of a polyester (A) comprising:
(i) a dicarboxylic acid portion comprising residues of terephthalic acid, isophthalic acid, or both; and
(ii) a glycol portion comprising 30 to 40 mole percent of 2,2,4,4-tetramethyl-1,3-cyclobutanediol residues and 60 to 70 mole percent of 1,4-cyclohexanedimethanol residues; and
(b) 20 to 55 weight percent of a polyester (B) comprising a polyalkylene terephthalate;
wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the invention provides a polyester blend comprising:
- (a) 50 to 85 weight percent of a polyester (A) comprising:
  - (i) a dicarboxylic acid portion comprising residues of terephthalic acid, isophthalic acid, or both; and
  - (ii) a glycol portion comprising 30 to 40 mole percent of 2,2,4,4-tetramethyl-1,3-cyclobutanediol residues and 60 to 70 mole percent of 1,4-cyclohexanedimethanol residues; and
- (b) 15 to 50 weight percent of a polyester (B) comprising a polyalkylene terephthalate;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the polymer blend according to the invention comprises:
- (a) 20 to 80 weight percent of a polyester (A) comprising:
  - (i) a dicarboxylic acid portion comprising 90 to 100 mole percent of residues of terephthalic acid, isophthalic acid, or both; and
  - (ii) a glycol portion comprising 5 to 50 mole percent of 2,2,4,4-tetramethyl-1,3-cyclobutanediol residues and 50 to 95 mole percent of 1,4-cyclohexanedimethanol residues;
- (b) 20 to 80 weight percent of polyalkylene terephthalate (polyester B);
- (c) 2 to 10 weight percent of an impact modifier; and
- (d) 0 to 1 weight percent of a phosphorus stabilizer;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

In one embodiment, the polymer blend according to the invention comprises:
- (a) 45 to 80 weight percent of a polyester (A) comprising:
  - (i) a dicarboxylic acid portion comprising 90 to 100 mole percent of residues of terephthalic acid, isophthalic acid, or both; and
  - (ii) a glycol portion comprising 5 to 50 mole percent of 2,2,4,4-tetramethyl-1,3-cyclobutanediol residues and 50 to 95 mole percent of 1,4-cyclohexanedimethanol residues;
- (b) 20 to 55 weight percent of a polyakylene terephthalate (polyester B);
- (c) 2 to 10 weight percent of an impact modifier; and
- (d) 0 to 1 weight percent of a phosphorus stabilizer;

wherein the total weight percentage of the blend equals 100 weight percent; and wherein for each of polyester (A) and polyester (B), the total mole % of the dicarboxylic acid portion is 100 mole %, and the total mole % of the glycol portion is 100 mole %.

In one embodiment, the polymer blend according to the invention comprises:
- (a) 20 to 80 weight percent of a polyester (A) comprising:
  - (i) a dicarboxylic acid portion comprising 90 to 100 mole percent of residues of terephthalic acid, isophthalic acid, or both; and
  - (ii) a glycol portion comprising 5 to 50 mole percent of 2,2,4,4-tetramethyl-1,3-cyclobutanediol residues and 50 to 95 mole percent of 1,4-cyclohexanedimethanol residues;
- (b) 20 to 80 weight percent of polyethylene terephthalate (PET);
- (c) 2 to 10 weight percent of an impact modifier; and
- (d) 0 to 1 weight percent of a phosphorus stabilizer;

wherein the total weight percentage of the blend equals 100 weight percent; and wherein for each of polyester (A) and polyester (B), the total mole % of the dicarboxylic acid portion is 100 mole %, and the total mole % of the glycol portion is 100 mole %.

In one embodiment, the polymer blend according to the invention comprises:
- (a) 45 to 80 weight percent of a polyester (A) comprising:
  - (i) a dicarboxylic acid portion comprising 90 to 100 mole percent of residues of terephthalic acid, isophthalic acid, or both; and
  - (ii) a glycol portion comprising 5 to 50 mole percent of 2,2,4,4-tetramethyl-1,3-cyclobutanediol residues and 50 to 95 mole percent of 1,4-cyclohexanedimethanol residues;
- (b) 20 to 55 weight percent of a polyethylene terephthalate (PET);
- (c) 2 to 10 weight percent of an impact modifier; and
- (d) 0 to 1 weight percent of a phosphorus stabilizer;

wherein for each of polyester (A) and polyester (B), the total mole % of the dicarboxylic acid portion is 100 mole %, and the total mole % of the glycol portion is 100 mole %; and wherein the total weight percentage of the blend equals 100 weight percent.

It has been surprisingly discovered that the immiscible blends of the present invention can have a toughness, as measured by notched Izod impact strength, that is significantly higher than additivity would predict. In addition, when polyester (B) (which is the polyalkylene terephthalate (PAT) component), of the present invention is crystalline, it has been surprisingly found that the PAT can retain a significant amount of its crystallinity and melting point. The blends of the present invention can also have very good melt stability based on low gas evolution and good retention of melt viscosity. Thus, the blend compositions of the present invention can have a surprising combination of toughness and good melt stability.

DETAILED DESCRIPTION OF THE INVENTION

Figure 1:
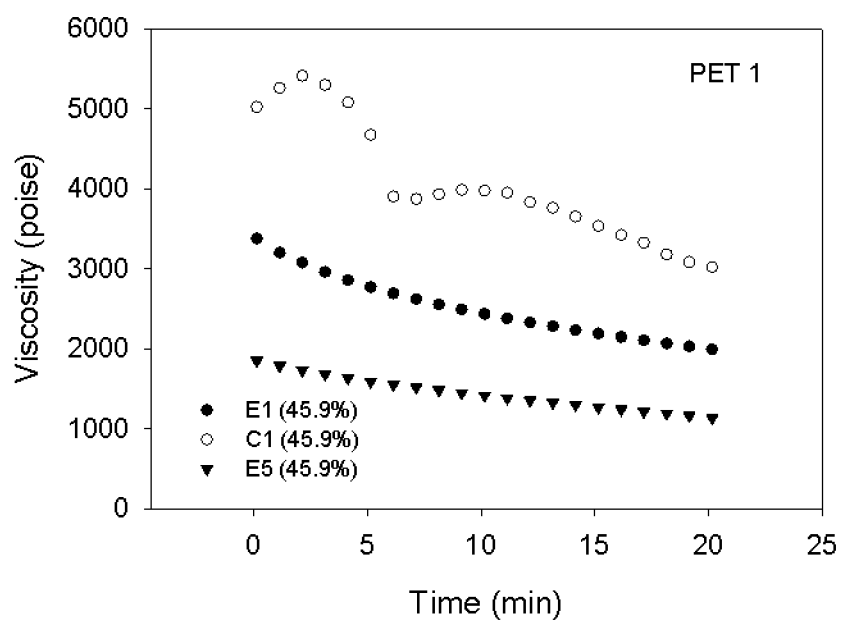
FIG. 1 is a graph of small-amplitude oscillatory shear (SAOS) rheology as a function of time of the blends from Example 1 (E1), Comparative Example 1 (C1), and Example 5 (E5) at 300° C.

According to the present invention, there is provided a polyester blend comprising:
- (a) 5 to 95 weight percent of a polyester (A) comprising:
  - (i) a dicarboxylic acid portion comprising residues of terephthalic acid, isophthalic acid, or both; and
  - (ii) a glycol portion comprising 5 to 100 mole percent of 2,2,4,4-tetramethyl-1,3-cyclobutanediol (TMCD) residues and 0 to 95 mole percent of 1,4-cyclohexanedimethanol (CHDM) residues; and (b) 5 to 95 weight percent of polyester (B), a polyalkylene terephthalate (PAT);

wherein for each of polyester (A) and polyester (B), the total mole % of the dicarboxylic acid portion is 100 mole %, and the total mole % of the glycol portion is 100 mole %; and wherein the total weight percentages of the blend equal 100 weight percent.

The polyesters (a) used in the present invention typically can be prepared from dicarboxylic acids and diols, which react in substantially equal proportions and are incorporated into the polyester polymer as their corresponding residues. The polyesters of the present invention, therefore, can contain substantially equal molar proportions of acid residues (100 mole %) and diol residues (100 mole %) such that the total moles of repeating units is equal to 100 mole %. The mole percentages provided herein, therefore, may be based on the total moles of acid residues, the total moles of diol residues, or the total moles of repeating units. For example, a polyester containing 20 mole % of isophthalic acid residues, based on the total acid residues, means that there are 20 moles of isophthalic acid residues for every 100 moles of acid residues. In another example, a polyester containing 30 mole % of 2,2,4,4-tetramethyl-1,3-cyclobutanediol residues, based on the total diol residues, means that there are 30 moles of 2,2,4,4-tetramethyl-1,3-cyclobutanediol residues for every 100 moles of diol residues.

The dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

The term "polyester," as used herein, is intended to include "copolyesters."

The term "residue," as used herein, means any organic structure incorporated into a polymer through a polycondensation and/or an esterification reaction from the corresponding monomer. Thus, for example, the dicarboxylic acid residues may be derived from a dicarboxylic acid monomer or its associated acid halides, esters, salts, anhydrides, or mixtures thereof. Therefore, reference to a dicarboxylic acid is intended to include the dicarboxylic acid itself and any derivative of the dicarboxylic acid, including its associated isomers, acid halides, esters, half-esters, salts, half-salts, anhydrides, mixed anhydrides, and mixtures thereof, useful in a reaction with a diol to make a polyester. Examples of esters of the dicarboxylic acids useful in this invention include the dimethyl, diproplyl, diisopropyl, dibutyl, diphenyl, etc.

For example, the term "terephthalic acid" is intended to include terephthalic acid itself as well as any derivative of terephthalic acid, including its associated isomers, acid halides, esters, half-esters, salts, half-salts, anhydrides, mixed anhydrides, and mixtures thereof, useful in a reaction with a diol to make a polyester.

In one embodiment, terephthalic acid may be used as the diacid starting material for the polyester component. In another embodiment, isophthalic acid may be used as the diacid starting material. In another embodiment, mixtures of terephthalic acid and isophthalic acid may be used as the diacid starting material.

The dicarboxylic acid portion of polyester (A) may be substituted with up to 20 mole %, or up to 10 mole %, or up to 5 mole %, of other aromatic dicarboxylic acids. Examples of suitable other aromatic dicarboxylic acids include 4,4'-biphenyldicarboxylic acid; 1,5-, 2,6-, and 2,7-naphthalenedicarboxylic acid; 4,4'-oxydibenzoic acid; and trans-4,4'-stilbenedicarboxylic acid. In addition, the dicarboxylic acid portion of the polyester may be substituted with aliphatic or cycloaliphatic dicarboxylic acids containing 6 to 12 carbon atoms such as succinic, glutaric, adipic, sebacic, suberic, azelaic, decanedicarboxylic, and dodecanedicarboxylic acids.

The TMCD may be cis, trans, or a mixture of the two. The CHDM may be cis, trans, or a mixture of the two.

The glycol portion of the polyester (A) may contain up to 20 mol % or up to 10 mole % or up to 5 mol %, of another glycol containing 2 to 16 carbon atoms. Examples of suitable other glycols include ethylene glycol, 1,2-propanediol, 1,3-propanediol, neopentyl glycol, 1,4-butanediol, 1,5-pentanediol, 1,6-hexanediol, and p-xylene glycol. The polyester may also be modified with polyethylene glycols or polytetramethylene glycols.

The term "glycol" as used in this application includes, but is not limited to, diols, glycols, and/or multifunctional hydroxyl compounds, for example, branching agents.

The polyesters (A) and/or (B) useful in the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, or 0.1 to 0.5 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyesters (A) and/or (B) useful in the invention can thus be linear or branched. The polycarbonate can also be linear or branched. In certain embodiments, the branching monomer or agent may be added prior to and/or during and/or after the polymerization of the polycarbonate.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos.

5,654,347 and 5,696,176, whose disclosure regarding branching monomers is incorporated herein by reference.

In one embodiment, the dicarboxylic acid portion of the polyester (A) comprises 100 mole percent of terephthalic acid residues, and the glycol portion of the polyester comprises 5 to 70 mole percent of TMCD residues and 30 to 95 mole percent of CHDM residues. In another embodiment, the dicarboxylic acid portion of the polyester (a) comprises 100 mole percent of terephthalic acid residues, and the glycol portion of the polyester comprises 5 to 50 mole percent of TMCD residues and 50 to 95 mole percent of CHDM residues.

In other aspects of the invention, the glycol component for the polyesters useful in the invention include but are not limited to at least one of the following combinations of ranges: 15 to 50 mole % 2,2,4,4-tetramethyl-1,3-cyclobutanediol and 50 to 85 mole % 1,4-cyclohexanedimethanol; 15 to 45 mole % 2,2,4,4-tetramethyl-1,3-cyclobutanediol and 55 to 85 mole % 1,4-cyclohexanedimethanol; 15 to 40 mole % 2,2,4,4-tetramethyl-1,3-cyclobutanediol and 60 to 85 mole % 1,4-cyclohexanedimethanol; 15 to 35 mole % 2,2,4,4-tetramethyl-1,3-cyclobutanediol and 65 to 85 mole % 1,4-cyclohexanedimethanol; 15 to 30 mole % 2,2,4,4-tetramethyl-1,3-cyclobutanediol and 70 to 85 mole % 1,4-cyclohexanedimethanol; 15 to 25 mole % 2,2,4,4-tetramethyl-1,3-cyclobutanediol and 75 to 85 mole % 1,4-cyclohexanedimethanol.

In other aspects of the invention, the glycol component for the polyesters useful in the invention include but are not limited to at least one of the following combinations of ranges: 20 to 50 mole % 2,2,4,4-tetramethyl-1,3-cyclobutanediol and 50 to 80 mole % 1,4-cyclohexanedimethanol; 20 to 45 mole % 2,2,4,4-tetramethyl-1,3-cyclobutanediol and 55 to 80 mole % 1,4-cyclohexanedimethanol; 20 to 40 mole % 2,2,4,4-tetramethyl-1,3-cyclobutanediol and 60 to 80 mole % 1,4-cyclohexanedimethanol; 20 to 35 mole % 2,2,4,4-tetramethyl-1,3-cyclobutanediol and 65 to 80 mole % 1,4-cyclohexanedimethanol; 20 to 30 mole % 2,2,4,4-tetramethyl-1,3-cyclobutanediol and 70 to 80 mole % 1,4-cyclohexanedimethanol; and 20 to mole % 2,2,4,4-tetramethyl-1,3-cyclobutanediol and 75 to 80 mole % 1,4-cyclohexanedimethanol.

In other aspects of the invention, the glycol component for the polyesters useful in the invention include but are not limited to at least one of the following combinations of ranges: 25 to 50 mole % 2,2,4,4-tetramethyl-1,3-cyclobutanediol and 50 to 75 mole % 1,4-cyclohexanedimethanol; 25 to 45 mole % 2,2,4,4-tetramethyl-1,3-cyclobutanediol and 55 to 75 mole % 1,4-cyclohexanedimethanol; 25 to 40 mole % 2,2,4,4-tetramethyl-1,3-cyclobutanediol and 60 to 75 mole % 1,4-cyclohexanedimethanol; 25 to 35 mole % 2,2,4,4-tetramethyl-1,3-cyclobutanediol and 65 to 75 mole % 1,4-cyclohexanedimethanol.

In other aspects of the invention, the glycol component for the polyesters useful in the invention include but are not limited to at least one of the following combinations of ranges: 30 to 50 mole % 2,2,4,4-tetramethyl-1,3-cyclobutanediol and 50 to 70 mole % 1,4-cyclohexanedimethanol; 30 to 45 mole % 2,2,4,4-tetramethyl-1,3-cyclobutanediol and 55 to 70 mole % 1,4-cyclohexanedimethanol; 30 to 40 mole % 2,2,4,4-tetramethyl-1,3-cyclobutanediol and 60 to 70 mole % 1,4-cyclohexanedimethanol; 30 to 35 mole % 2,2,4,4-tetramethyl-1,3-cyclobutanediol and 65 to 70 mole % 1,4-cyclohexanedimethanol.

The polyester (A) of the polymer blend may be prepared by methods known in the art.

The PAT component of this invention may be selected from polyethylene terephthalate (PET), polypropylene terephthalate (PPT), and polybutylene terephthalate (PBT).

The PAT contains repeat units from at least 90 mole percent of terephthalic acid and at least 65 mole percent of alkylene glycol, based on 100 mole percent dicarboxylic acid and 100 mole percent glycol. PAT resins are available commercially and methods for their preparation are described, for example, in U.S. Pat. Nos. 2,465,319 and 3,0477,539. In one embodiment, the alkylene glycol may be one or more of ethylene glycol, propylene glycol, and butylene glycol. In one embodiment, the alkylene glycol is ethylene glycol.

The dicarboxylic acid portion of the PAT may be substituted with up to 20 mole %, or up to 10 mole % or up to 5 mol % of one or more dicarboxylic acids other than terephthalic acid or suitable equivalents thereof such as dimethyl terephthalate. Such additional dicarboxylic acids include but are not limited to aromatic dicarboxylic acids having 8 to 14 carbon atoms, aliphatic dicarboxylic acids having 4 to 12 carbon atoms, and cycloaliphatic dicarboxylic acids having 8 to 12 carbon atoms. Examples of suitable additional dicarboxylic acids include isophthalic acid, naphthalene-2,6-dicarboxylic acid, cyclohexande dicarboxylic acid, cyclohexane diacetic acid, diphenyl-4,4'-dicarboxylic acid, succinic, glutaric, adipic, sebacic, suberic, azelaic, decanedicarboxylic, and dodecanedicarboxylic acids. The PAT may include two or more of the above additional dicarboxylic acids.

In addition, the PAT may be modified with up to about 35 mol % of another aliphatic glycol containing 2 to 16 carbon atoms. Examples of suitable other glycols include 1,2-ethanediol, 1,2-propanediol, 1,3-propanediol, neopentyl glycol, 1,4-butandediol, 1,5-pentanediol, 1,6 hexanediol, and 1,4-cyclohexandimethanol. The PAT may also be modified with polyethylene glycols or polytetramethylene glycols.

In one embodiment, the PAT is a polyethylene terephthalate (PET) comprising at least 90 mole percent of terephthalic acid residues based on 100 mole percent of dicarboxylic acid residues in the PET, and 65 to 100 mole percent of ethylene glycol residues and 0 to 35 mole percent of 1,4-cyclohexanedimethanol residues based on 100 mole percent of glycol residues in the PET.

In another embodiment, the PAT is a polyethylene terephthalate (PET) comprising at least 90 mole percent of terephthalic acid residues based on 100 mole percent of dicarboxylic acid residues in the PET, and at least 90 mole percent of ethylene glycol residues based on 100 mole percent of glycol residues in the PET.

For certain embodiments of the invention, the polyesters (A) or (B) may exhibit at least one of the following inherent viscosities as determined in 60/40 (wt/wt) phenol/tetrachloroethane at a concentration of 0.5 g/100 ml at 25° C., 0.10 to 1.2 dL/g; 0.35 to 1.2 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.60 to 1.2 dL/g; 00.60 to 0.85 dL/g; 0.60 to 0.80 dL/g; 0.60 to 0.75 dL/g; 0.60 to 0.70 dL/g; or 0.60 to 0.68 dL/g.

In certain embodiments of the invention, the weight percentages of polyester (A) and polyester (B) useful in the blends of the invention include but are not limited to at least one of the following combinations of ranges: 15 to 99 weight % polyester (A) and 1 to 85 weight % polyester (B); 15 to 95 weight % polyester (A) and 5 to 85 weight % polyester (B); 15 to 90 weight % polyester (A) and 10 to 85 weight % polyester (B); 15 to 85 weight % polyester (A) and 15 to 85 weight % polyester (B); 15 to 75 weight % polyester (A) and 25 to 85 weight % polyester (B); 15 to 70 weight % polyester (A) and 30 to 85 weight % polyester (B); 15 to 65 weight % polyester (A) and 35 to 85 weight % polyester (B); 15 to 60 weight % polyester (A) and 40 to 85 weight % polyester (B); 15 to 55 weight % polyester (A) and 45 to 85 weight % polyester (B); 15 to 50 weight % polyester (A) and 50 to 85 weight % polyester (B); 15 to 40 weight % polyester (A) and 60 to 85 weight % polyester (B); 15 to 35 weight % polyester (A) and 65 to 85 weight % polyester (B); 15 to 30 weight % polyester (A) and 70 to 85 weight % polyester (B); and 15 to 25 weight % polyester (A) and 75 to 85 weight % polyester (B).

In certain embodiments of the invention, the weight percentages of polyester (A) and polyester (B) useful in the blends of the invention include but are not limited to at least one of the following combinations of ranges: 20 to 99 weight % polyester (A) and 1 to 80 weight % polyester (B); 20 to 95 weight % polyester (A) and 5 to 80 weight % polyester (B); 20 to 90 weight % polyester (A) and 10 to 80 weight % polyester (B); 20 to 85 weight % polyester (A) and 15 to 80 weight % polyester (B); 20 to 80 weight % polyester (A) and 20 to 80 weight % polyester (B), 20 to 75 weight % polyester (A) and 25 to 80 weight % polyester (B); 20 to 70 weight % polyester (A) and 30 to 80 weight % polyester (B); 20 to 65 weight % polyester (A) and 35 to 80 weight % 1 polyester (B); 20 to 60 weight % polyester (A) and 40 to 80 weight % polyester (B); 20 to 55 weight % polyester (A) and 45 to 80 weight % polyester (B); 20 to 50 weight % polyester (A) and 50 to 80 weight % polyester (B); 20 to 45 weight % polyester (A) and 55 to 80 weight % polyester (B); 20 to 40 weight % polyester (A) and 60 to 80 weight % polyester (B); 20 to 35 weight % polyester (A) and 65 to 80 weight % polyester (B); and 20 to 30 weight % polyester (A) and 70 to 80 weight % polyester (B).

In certain embodiments of the invention, the weight percentages of polyester (A) and polyester (B) useful in the blends of the invention include but are not limited to at least one of the following combinations of ranges: 25 to 99 weight % polyester (A) and 1 to 75 weight % polyester (B); 25 to 95 weight % polyester (A) and 5 to 75 weight % polyester (B); 25 to 90 weight % polyester (A) and 10 to 75 weight % polyester (B); 25 to 85 weight % polyester (A) and 15 to 75 weight % polyester (B); 25 to 80 weight % polyester (A) and 20 to 75 weight % polyester (B), 25 to 75 weight % polyester (A) and 25 to 75 weight % polyester (B); 25 to 70 weight % polyester (A) and 30 to 75 weight % polyester (B); 25 to 65 weight % polyester (A) and 35 to 75 weight % polyester (B); 25 to 60 weight % polyester (A) and 40 to 75 weight % polyester (B); 25 to 55 weight polyester (A) and 45 to 75 weight % polyester (B); 25 to 50 weight % polyester (A) and 50 to 75 weight % polyester (B); 25 to 40 weight % polyester (A) and 60 to 75 weight % polyester (B); and 25 to 35 weight % polyester (A) and 65 to 75 weight % polyester (B).

In certain embodiments of the invention, the weight percentages of polyester (A) and polyester (B) useful in the blends of the invention include but are not limited to at least one of the following combinations of ranges: 30 to 99 weight % polyester (A) and 1 to 70 weight % polyester (B); 30 to 95 weight % polyester (A) and 5 to 70 weight % polyester (B); 30 to 90 weight % polyester (A) and 10 to 70 mole % weight % polyester (B); 30 to 85 weight % polyester (A) and 15 to 70 weight % polyester (B); 30 to 80 weight % polyester (A) and 20 to 70 weight % polyester (B), 30 to 75 weight % polyester (A) and 25 to 70 weight % polyester (B); 30 to 70 weight % polyester (A) and 30 to 70 weight % polyester (B); 30 to 65 weight % polyester (A) and 35 to 70 weight % polyester (B); 30 to 60 weight % polyester (A) and 40 to 70 weight % polyester (B); 30 to 55 weight % polyester (A) and 45 to 70 weight % polyester (B); 30 to 50 weight % polyester (A) and 50 to 70 weight % polyester (B); 30 to 40 weight % polyester (A) and 60 to 70 weight % polyester (B); 30 to 35 weight % polyester (A) and 65 to 70 weight % polyester (B).

In certain embodiments of the invention, the weight percentages of polyester (A) and polyester (B) useful in the blends of the invention include but are not limited to at least one of the following combinations of ranges: 35 to 99 weight % polyester (A) and 1 to 65 weight % polyester (B); 35 to 95 weight % polyester (A) and 5 to 65 weight % polyester (B); 35 to 90 weight % polyester (A) and 10 to 65 weight % polyester (B); 35 to 85 weight % polyester (A) and 15 to 65 weight % polyester (B); 35 to 80 weight % polyester (A) and 20 to 65 weight % polyester (B), 35 to 75 weight % polyester (A) and 25 to 65 weight % polyester (B); 35 to 70 weight % polyester (A) and 30 to 65 weight % polyester (B); 35 to 65 weight % polyester (A) and 35 to 65 weight % polyester (B); 35 to 60 weight % polyester (A) and 40 to 65 weight % polyester (B); 35 to 55 weight % polyester (A) and 45 to 65 weight % polyester (B); 35 to 50 weight % polyester (A) and 50 to 65 weight % polyester (B).

In certain embodiments of the invention, the weight percentages of polyester (A) and polyester (B) useful in the blends of the invention include but are not limited to at least one of the following combinations of ranges: 40 to 99 weight % polyester (A) and 1 to 60 weight % polyester (B); 40 to 95 weight % polyester (A) and 5 to 60 mole % weight % polyester (B); 40 to 90 weight % polyester (A) and 10 to 60 weight % polyester (B); 40 to 85 weight % polyester (A) and 15 to 60 weight % polyester (B); 40 to 80 weight % polyester (A) and 20 to 60 weight % polyester (B), 40 to 75 weight % polyester (A) and 25 to 60 weight % polyester (B); 40 to 70 weight % polyester (A) and 30 to 60 weight % polyester (B); 40 to 65 weight % polyester (A) and 35 to 60 weight % polyester (B); 40 to 60 weight % polyester (A) and 40 to 60 weight % polyester (B); 40 to 55 weight % polyester (A) and 45 to 60 weight % polyester (B); and 40 to 50 weight % polyester (A) and 50 to 60 weight % polyester (B).

In certain embodiments of the invention, the weight percentages of polyester (A) and polyester (B) useful in the blends of the invention include but are not limited to at least one of the following combinations of ranges: 45 to 99 weight % polyester (A) and 1 to 55 weight % polyester (B); 45 to 95 weight % polyester (A) and 5 to 55 weight % polyester (B); 45 to 90 weight % polyester (A) and 10 to 55 weight % polyester (B); 45 to 85 weight % polyester (A) and 15 to 55 weight % polyester (B); 45 to 80 weight % polyester (A) and 20 to 55 weight % polyester (B), 45 to 75 weight % polyester (A) and 25 to 55 weight % polyester (B); 45 to 70 weight % polyester (A) and 30 to 55 weight % polyester (B); 45 to 65 weight % polyester (A) and 35 to 55 weight % polyester (B); 45 to 60 weight % polyester (A) and 40 to 55 weight % polyester (B); and 45 to 55 weight % polyester (A) and 45 to 55 weight % polyester (B).

In certain embodiments of the invention, the weight percentages of polyester (A) and polyester (B) useful in the blends of the invention include but are not limited to at least one of the following combinations of ranges: 50 to 99 weight % polyester (A) and 1 to 50 weight % polyester (B); 50 to 90 weight % polyester (A) and 10 to 50 weight % polyester (B);

50 to 85 weight % polyester (A) and 15 to 50 weight % polyester (B); 50 to 80 weight % polyester (A) and 20 to 50 weight % polyester (B), 50 to 75 weight % polyester (A) and 25 to 50 weight % polyester (B); 50 to 70 weight % polyester (A) and 30 to 50 weight % polyester (B); 50 to 65 weight % polyester (A) and 35 to 50 weight % polyester (B); 50 to 60 weight % polyester (A) and 40 to 50 weight % polyester (B).

In certain embodiments of the invention, the weight percentages of polyester (A) and polyester (B) useful in the blends of the invention include but are not limited to at least one of the following combinations of ranges: 55 to 99 weight % polyester (A) and 1 to 45 mole % weight % polyester (B); 55 to 95 weight % polyester (A) and 5 to 45 weight % polyester (B); 55 to 90 weight % polyester (A) and 10 to 45 weight % polyester (B); 55 to 85 weight % polyester (A) and 15 to 45 weight % polyester (B); 55 to 80 weight % polyester (A) and 20 to 45 weight % polyester (B), 55 to 75 weight % polyester (A) and 25 to 45 weight % polyester (B); 55 to 70 weight % polyester (A) and 30 to 45 weight % polyester (B); and 55 to 65 weight % polyester (A) and 35 to 45 mole % weight % polyester (B).

In certain embodiments of the invention, the weight percentages of polyester (A) and polyester (B) useful in the blends of the invention include but are not limited to at least one of the following combinations of ranges: 60 to 99 weight % polyester (A) and 1 to 40 weight % polyester (B); 60 to 95 weight % polyester (A) and 5 to 40 weight % polyester (B); 60 to 90 weight % polyester (A) and 10 to 40 weight % polyester (B); 60 to 85 weight % polyester (A) and 15 to 40 weight % polyester (B); 60 to 80 weight % polyester (A) and 20 to 40 weight % polyester (B), 60 to 75 weight % polyester (A) and 25 to 40 weight % polyester (B); and 60 to 70 weight % polyester (A) and 30 to 40 weight % polyester (B).

In certain embodiments of the invention, the weight percentages of polyester (A) and polyester (B) useful in the blends of the invention include but are not limited to at least one of the following combinations of ranges: 65 to 99 weight % polyester (A) and 1 to 35 weight % polyester (B); 65 to 95 weight % polyester (A) and 5 to 35 weight % polyester (B); 65 to 90 weight % polyester (A) and 10 to 35 weight % polyester (B); 65 to 85 weight % polyester (A) and 15 to 35 weight % polyester (B); 65 to 80 weight % polyester (A) and to 35 weight % polyester (B), and 65 to 75 weight % polyester (A) and 25 to 35 weight % polyester (B).

In certain embodiments of the invention, the weight percentages of polyester (A) and polyester (B) useful in the blends of the invention include but are not limited to at least one of the following combinations of ranges: 70 to 99 weight % polyester (A) and 1 to 30 weight % polyester (B); 70 to 95 and to 30 weight % polyester (A); 70 to 90 weight % polyester (A) and 10 to 30 weight % polyester (B); 70 to 85 weight % polyester (A) and 15 to 30 weight % polyester (B); 70 to 80 weight % polyester (A) and 20 to 30 weight % polyester (B).

In certain embodiments of the invention, the weight percentages of polyester (A) and polyester (B) useful in the blends of the invention include but are not limited to at least one of the following combinations of ranges: 75 to 99 weight % polyester (A) and 1 to 25 weight % polyester (B); 75 to 95 weight % polyester (A) and 5 to 25 weight % polyester (B); 75 to 90 weight % polyester (A) and 10 to 25 weight % polyester (B); and 75 to 85 weight % polyester (A) and 15 to 25 weight % polyester (B).

The polyalkylene terephthalates useful in the invention may be recycled prior to their use in the blends of the invention. In one embodiment, the polyalkylene terephthalates useful in the invention may be post-consumer recycled PAT. In another embodiment, polyester (B) may be post-consumer recycled PET.

The polymer blends of the invention may contain up to 20 weight percent of an impact modifier and up to 5 weight percent of a phosphorus stabilizer based on the total weight of the blend. The polymer blends of the invention may contain up to 20 weight percent of an impact modifier and up to 1 weight percent of a phosphorus stabilizer based on the total weight of the blend. In one embodiment, the blend comprises 1 to 15 weight percent of the impact modifier based on the total weight of the blend. In another embodiment, the blend comprises 2 to 10 weight percent of the impact modifier based on the total weight of the blend.

The impact modifier may be selected from the broad classes of acrylic core-shell polymers, ABS copolymer, butyl rubber, functional epoxy olefins, and modified polyethylenes such as ethylene/propylene rubbers (EPR) and their modifications.

The acrylic core-shell impact modifiers have a rubbery core, which may be either an acrylic rubber or butadiene or styrene-butadiene rubber. In each modifier, the Tg of the rubber phase should be below 25° C. as measured by Differential Scanning Calorimetery (DSC). The shell of these impact modifiers is a hard acrylic-based polymer, for example, poly(methylmethacrylate). Representatively, acrylic core-shell polymers and their use are described in U.S. Pat. Nos. 4,096,202; 3,864,428; and 4,200,567.

In one embodiment, the ethylene/propylene rubbers may be copolymers of ethylene and propylene with a ratio of about 1:1. They may also contain a small amount of diene monomer such as ethylidene norbornene, dicyclopentadiene, and hexadiene (EPDM rubbers). Any of these systems may be further grafted with other monomers such as an alkenoic nitrile, ester, amide, or acid, or a vinyl aromatic monomer such as styrene, or mixtures of an alkenoic monomer and vinyl aromatic monomer. These systems are described, for example, in U.S. Pat. Nos. 4,550,138; 4,485,212; and 4,493,921.

The phosphorus stabilizer has at least one or a combination of two or more of the following advantages: catalyst deactivation, melt stability and color stability. Melt stability can be important in melt processing. Examples of phosphorus stabilizers include but are not limited to organic phosphite stabilizers such as tris(2,4-di-butylphenyl)phosphite (Irgafos 168), distearyl pentaerythritol diphosphite (Weston 619), tris-nonylphenyl phosphate (TNPP), trilauryl phosphite, triphenyl phosphate, triphenyl phosphine and diisooctyl phosphite. Other phosphorus compounds useful in the invention can include other phosphates, aryl phosphonites and acidic phosphorous compounds. The phosphorus stabilizer can be replaced by other compounds known to be effective as catalyst deactivators, melt stabilizers and/or color stabilizers.

The blends of this invention may be prepared by any conventional mixing methods. In one embodiment, one method comprises mixing the polyesters, impact modifiers, and stabilizers in powder or granular form in an extruder and extruding the mixture into strands, chopping the strands into pellets, and molding the pellets into the desired article.

The polymer blend may comprise 0.01 to 25 weight percent of at least one other additive such as colorants, dyes, mold release agents, flame retardants, plasticizers, nucleating agents, UV light stabilizers, fillers, processing aids, and reinforcing materials such as glass fibers.

Another aspect of the present invention relates to articles of manufacture comprising the polyester blends of the invention. Such articles of manufacture can be chosen from films, sheets, fibers, and molded articles.

The following abbreviations apply throughout the specification, working examples and figures:

| | |
|---|---|
| TMCD | 2,2,4,4-tetramethyl-1,3-cyclobutanediol |
| CHDM | 1,4-cyclohexanedimethanol |
| PET | poly(ethylene terephthalate) |
| PAT | poly(alkylene terephthalate) |
| IV | Inherent viscosity |
| wt | weight |
| x | Test not performed |

This invention can be further illustrated by the following working examples, although it should be understood that these examples are included merely for purposes of illustration and are not intended to limit the scope of the invention.

EXAMPLES

Measurement Methods

The inherent viscosity (IV) of the polyesters was determined in 60/40 (wt/wt) phenol/tetrachloroethane at a concentration of 0.5 g/100 ml at 25° C., and is reported throughout this section in units of dl/g.

The composition of the neat resins was determined by proton nuclear magnetic resonance spectroscopy (NMR).

The glass transition temperatures, melting points, and heat of fusion were determined using a TA Instruments differential scanning calorimeter (DSC) at a scan rate of 20° C. All reported values are of the second cycle. Because the blends in the following examples were mostly immiscible, two glass transition temperatures were observed—one for the PET phase and one for the second polyester component. These Tg's are reported in Tables 1-4 for all of the polyester blends. The occurrence of only one Tg may indicate increasing miscibility of the two phases. But it cannot preclude the possibility that the transition was simply too weak for the DSC instrumentation to detect.

The degree of crystallinity of the PET in each blend was determined by dividing the measured heat of fusion by the known heat of fusion for 100% crystalline PET (29 cal/g).

Mechanical properties of all blends were characterized using the following methods:

Heat deflection temperature, at 264 psi, was determined according to ASTM D648.

Flexural modulus and flexural strength were determined according to ASTM D790.

Tensile properties (break strength, break elongation) were determined according to ASTM D638.

Notched Izod impact strengths were determined according to ASTM D 256, at 23° C. for both 0.125" and 0.250" thick bars.

Polyester blends tend to have poor thermal stability in the molten state, due to reaction between the components. Consequently, the melt stability of each prepared blend was evaluated using both small-amplitude oscillatory shear (SAOS) rheology and gas evolution analysis. The former allows quantification of changes in the melt viscosity as a function of time, while the latter allows for the detection of degradation byproducts. Both provide useful assessment of blend stability.

SAOS rheological analysis was performed at 300° C. for 20 min, using a frequency of 100 $s^{-1}$. For the offgas measurements, two grams (+/−0.01 g) of the dried polymer sample were weighed into a 20-ml screw top headspace glass vial. The vial was fitted with a screw top containing a silicone septum. The container was purged with nitrogen for two minutes, prior to experimentation. The blends were heated to 300° C. by an aluminum heater block, controlled by a Eurotherm controller which kept the temperature within 1° C. of the set point.

The gas evolution during heating was monitored by gas chromatography (GC) using an Agilent 3000A, two-channel Micro GC, which automatically sampled the headspace every 3.5 min. Because carbon dioxide ($CO_2$) is a common degradation byproduct in polyester blends, analysis software was used to quantify the $CO_2$ evolution over a 60-minute period. This, in turn, allowed calculation of an offgas rate.

Blend Preparation Procedure

All blends were prepared using a 30-mm Werner Pflieder twin-screw extruder. The polyester components were first dried at 90° C. and the PET polyester was dried at 100° C., both for 6 hours. The polyesters and other additives were premixed by tumble blending polyester pellets with the other components. The mixture was fed into the extruder and run at 350 rpm and at a feed rate to give a machine torque between 80-100%. The final extrudate was pelletized and subsequently injection molded into test specimens on a Toyo 90 injection molding machine. Melt temperatures for both compounding and injection molding were maintained in the range of 260° C. to 300° C. for all blends.

All blends contain 0.2 wt % of the phosphorus stabilizer identified below.

All blends contain 8 wt % of the impact modifier identified below, except for those in Examples 3, 4, and 6, and Comparative Examples 3 and 4, which contain only 6 wt % of the impact modifier.

Polyester Components

Copolyester 1 (AAC 1)—This copolyester contained 100 mol % of terephthalic acid residues, 23 mol % of 2,2,4,4-tetramethyl-1,3-cyclobutanediol (60 mol % cis isomer) residues, and 77 mole % of 1,4-cyclohexanedimethanol residues. The inherent viscosity was measured to be 0.72 (±0.03) dl/g. Blends using Copolyester 1 (AAC 1) are considered examples of this invention.

Copolyester 2 (AAC 2)—This copolyester contained 100 mol % of terephthalic acid residues, 35 mol % of 2,2,4,4-tetramethyl-1,3-cyclobutanediol (60 mol % cis isomer) residues, and 65 mol % of 1,4-cyclohexanedimethanol residues. The inherent viscosity was measured to be 0.64 (±0.03) dl/g. Blends using Copolyester 2 (AAC 2) are considered examples of this invention.

Polycarbonate polyester (PC)—This polyester is the polycarbonate of 4,4'-isopropylidenediphenol (bisphenol A), a commercially available resin sold under the name Makrolon 2608. Blends using polycarbonate polyester with PET are considered comparative examples.

Polyethylene Terephthalate (PET) Components

PET 1—In addition to terephthalic acid and ethylene glycol residues, this PET contained 3.5 mole % of 1,4-cyclohexanedimethanol residues and 1.5 mole % of diethylene glycol residues. PET 1 had an inherent viscosity of about 0.76 dl/g.

PET 2—In addition to terephthalic acid and ethylene glycol residues, this PET contains 3.5 mole % of 1,4-cyclohexanedimethanol residues and 1.5 mole % of diethylene glycol residues. PET 2 had an inherent viscosity of about 0.56 dl/g.

PET 3—In addition to terephthalic acid and ethylene glycol residues, this PET contained 2.5 mole % of isophthalic acid residues and 1.5 mole % of diethylene glycol residues. PET 3 had an inherent viscosity of about 0.71 dl/g.

PET 4—In addition to terephthalic acid and ethylene glycol residues, this PET contained 2.5 mole % of isophthalic acid residues and 1.5 mole % of diethylene glycol residues. PET 4 had an inherent viscosity of about 0.80 dl/g.

Additive Components

Methyl methacrylate-butadiene-styrene (MBS) Copolymer—This is an impact modifier commercially sold under the name Clearstrength E920.

Tris-(2,4-di-t-butylphenyl)phosphite—This is a phosphorus stabilizer commercially sold under the name Irgafos 168.

Example 1

AAC 1 and PET 1 were blended together according to the Blend Preparation Procedure described above. The amounts of AAC 1 and PET 1 in each blend are set forth in Table 1. The properties of each blend are also reported in Table 1. The measured off-gas rate of $CO_2$ during annealing of Blend E at 300° C. is reported in Table 5.

Example 2

AAC 1 and PET 2 were blended together according to the Blend Preparation Procedure described above. The amounts of AAC 1 and PET 2 in each blend are set forth in Table 2. The properties of each blend are also reported in Table 2. The measured off-gas rate of $CO_2$ during annealing of Blend E at 300° C. is reported in Table 5.

Example 3

AAC 1 and PET 3 were blended together according to the Blend Preparation Procedure described above. The amounts of AAC 1 and PET 3 in each blend are set forth in Table 3. The properties of each blend are also reported in Table 3. The measured off-gas rate of $CO_2$ during annealing of Blend E at 300° C. is reported in Table 5.

Example 4

AAC 1 and PET 4 were blended together according to the Blend Preparation Procedure described above. The amounts of AAC 1 and PET 4 in each blend are set forth in Table 4. The properties of each blend are also reported in Table 4. The measured off-gas rate of $CO_2$ during annealing of Blend E at 300° C. is reported in Table 5.

Example 5

AAC 2 and PET 1 were blended together according to the Blend Preparation Procedure described above. The amounts of AAC 2 and PET 1 in each blend are set forth in Table 1. The properties of each blend are also reported in Table 1. The measured off-gas rate of $CO_2$ during annealing of Blend E at 300° C. is reported in Table 5.

Example 6

AAC 2 and PET 4 were blended together according to the Blend Preparation Procedure described above. The amounts of AAC 2 and PET 4 in each blend are set forth in Table 4. The properties of each blend are also reported in Table 4. The measured off-gas rate of $CO_2$ during annealing of Blend E at 300° C. is reported in Table 5.

Comparative Example 1

PC and PET 1 were blended together according to the Blend Preparation Procedure described above. The amounts of PC and PET 1 in each blend are set forth in Table 1. The properties of each blend are also reported in Table 1. The measured off-gas rate of $CO_2$ during annealing of Blend E at 300° C. is reported in Table 5.

Comparative Example 2

PC and PET 2 were blended together according to the Blend Preparation Procedure described above. The amounts of PC and PET 2 in each blend are set forth in Table 2. The properties of each blend are also reported in Table 2. The measured off-gas rate of $CO_2$ during annealing of Blend E at 300° C. is reported in Table 5.

Comparative Example 3

PC and PET 3 were blended together according to the Blend Preparation Procedure described above. The amounts of PC and PET 3 in each blend are set forth in Table 3. The properties of each blend are also reported in Table 3. The measured off-gas rate of $CO_2$ during annealing of Blend E at 300° C. is reported in Table 5.

Comparative Example 4

PC and PET 4 were blended together according to the Blend Preparation Procedure described above. The amounts of PC and PET 4 in each blend are set forth in Table 4. The properties of each blend are also reported in Table 4. The measured off-gas rate of $CO_2$ during annealing of Blend E at 300° C. is reported in Table 5.

TABLE 1

Blends of Examples 1 (E1) and 5 (E5), and Comparative Example 1 (C1)

| | Blend | | | | | | | Example No. |
|---|---|---|---|---|---|---|---|---|
| | A | B | C | D | E | F | G | |
| Wt % PET 1 | 0 | 18.4 | 27.5 | 36.7 | 45.9 | 68.9 | 91.8 | |
| Wt % Polyester (AAC 1, AAC 2, or PC) | 91.8 | 73.4 | 64.3 | 55.1 | 45.9 | 22.9 | 0 | |
| Heat Deflection Temperature at 264 psi (° C.) | 76 | 69 | 67 | 64 | 63 | 61 | 60 | E1 |
| | 123 | 113 | 103 | 90 | 70 | 63 | 60 | C1 |
| | 82 | 76 | x | 65 | 63 | 62 | 60 | E5 |
| Flexural Modulus (MPa) | 1456 | 1597 | 1621 | 1683 | 1744 | 1913 | 2091 | E1 |
| | 2094 | 2138 | 2172 | 2178 | 2175 | 2158 | 2091 | C1 |
| | 1495 | 1643 | x | 1764 | 1817 | 1895 | 2091 | E5 |
| Flexural Strength (MPa) | 56 | 58 | 59 | 59 | 61 | 63 | 65 | E1 |
| | 82 | 82 | 81 | 79 | 77 | 71 | 65 | C1 |
| | 58 | 61 | x | 62 | 63 | 62 | 65 | E5 |

TABLE 1-continued

Blends of Examples 1 (E1) and 5 (E5), and Comparative Example 1 (C1)

| | Blend | | | | | | | Example |
|---|---|---|---|---|---|---|---|---|
| | A | B | C | D | E | F | G | No. |
| Tensile Strength | 51 | 47 | 47 | 46 | 49 | 42 | 39 | E1 |
| (MPa) | 58 | 59 | 59 | 60 | 55 | 36 | 39 | C1 |
| | 44 | 46 | x | 47 | 45 | 40 | 39 | E5 |
| Tensile Break | 215 | 187 | 216 | 214 | 297 | 343 | 438 | E1 |
| Elongation | 94 | 116 | 133 | 176 | 165 | 194 | 438 | C1 |
| (%) | 112 | 142 | x | 184 | 187 | 320 | 438 | E5 |
| Notched Izod at 23° C. | 892 | 979 | 1036 | 1107 | 1108 | 1209 | 246 | E1 |
| (J/m)(⅛" bar) | 770 | 787 | 808 | 897 | 925 | 336 | 246 | C1 |
| | 703 | 860 | x | 993 | 1071 | 1233 | 246 | E5 |
| ¼" Bars Notched Izod | 717 | 883 | 955 | 1012 | 1040 | 398 | 105 | E1 |
| at 23° C. | 620 | 568 | 428 | 473 | 145 | 157 | 105 | C1 |
| (J/m) | 619 | 653 | x | 421 | 281 | 219 | 105 | E5 |
| Tg-1 | x | 79.9 | 79.5 | 79.9 | 78.3 | 80.0 | 79.4 | E1 |
| (° C.) | 78.0 | 78.5 | 78.9 | 79.4 | 80.0 | absent | 79.4 | C1 |
| | x | 79.6 | x | 79.4 | 78.9 | 76.8 | 79.4 | E5 |
| Tg-2 | 104.0 | 104.9 | 103.9 | 104.0 | 104.9 | 105.2 | x | E1 |
| (° C.) | 146.9 | 140.6 | 141.8 | absent | absent | absent | x | C1 |
| | 116.5 | 113.9 | x | 115.0 | 110.1 | 90.7 | x | E5 |
| Tm | x | absent | absent | 240.7 | 241.0 | 240.5 | 241.6 | E1 |
| (° C.) | x | absent | absent | 237.6 | 239.1 | 238.4 | 241.6 | C1 |
| | x | x | x | 241.3 | 242.0 | 242.4 | 241.6 | E5 |
| % Crystalline PET | 0.0 | 0.0 | 0.0 | 9.2 | 6.9 | 4.6 | 2.0 | E1 |
| | 0.0 | 0.0 | 0.0 | 0.2 | 2.7 | 2.3 | 2.0 | C1 |
| | 0.0 | 0.0 | x | 16.6 | 31.6 | 0.8 | 2.0 | E5 |

Table 1 shows the composition and physical properties of the blends of this invention (E1 and E5)—the copolyesters AAC 1 and AAC 2 compounded with PET 1. Relative to the comparative example (C1), the blends of this invention consistently showed higher tensile elongation at break, notched Izod impact toughness at room temperature (23° C.), melting temperatures, and levels of crystallinity for the PET phase of the immiscible blend. These improvements were consistent across the compositional space examined. Furthermore, both of the copolyesters showed this unique behavior, despite having differences in composition (23/77 compared to 35/65 mol % TMCD/mol % CHDM for AAC 1 and AAC 2, respectively) and inherent viscosity (0.72 compared to 0.64).

In particular, the toughness enhancement for the example blends compared favorably with the comparative example. For example, the ¼" notched Izod (23° C.) energy at break values in Table 1 for E1 were higher than those of the comparative example (C1). In addition, the blends of this invention generally increased in toughness with higher amounts of PET, until at least 68.9 wt %. In contrast, the polycarbonate comparative example showed only limited improvement before exhibiting a dramatic drop in toughness with addition of the PET beyond only 45.9 wt %. The higher Izod values strongly indicate improved toughness of the blends of this invention.

The example blends in Table 1 also exhibited higher melting temperatures and levels of PET crystallinity, compared to the comparative example blends. (In the table, "absent" indicates that no melting point was detected in the DSC experiment, whereas "x" denotes the test was not performed.) The higher melting points signify that the crystal structure of PET may be more perfectly formed when blended with the copolyesters, rather than other polyesters like polycarbonate. Increased levels of crystallinity suggest that the PET is more phase separated in blends with AAC 1 or AAC 2, consequently allowing it to crystallize more readily and to a higher degree than in the polycarbonate blends.

TABLE 2

Blends of Example 2 (E2) and Comparative Example 2 (C2)

| | Blend | | | | | | | Example |
|---|---|---|---|---|---|---|---|---|
| | A | B | C | D | E | F | G | No. |
| Wt % PET 2 | 0 | 18.4 | 27.5 | 36.7 | 45.9 | 68.9 | 91.8 | |
| Wt % Polyester (AAC 1 or PC) | 91.8 | 73.4 | 64.3 | 55.1 | 45.9 | 22.9 | 0 | |
| Heat Deflection | 76 | 70 | 67 | 64 | 57 | 61 | 60 | E2 |
| Temperature at 264 psi (° C.) | 123 | 110 | 105 | 97 | 69 | 62 | 60 | C2 |
| Flexural Modulus | 1443 | 1628 | 1713 | 1798 | 1827 | 1981 | 2138 | E2 |
| (MPa) | 2159 | 2253 | 2207 | 2235 | 2217 | 2135 | 2138 | C2 |
| Flexural Strength | 56 | 61 | 62 | 62 | 62 | 63 | 65 | E2 |
| (MPa) | 86 | 85 | 84 | 81 | 76 | 71 | 65 | C2 |
| Tensile Strength | 47 | 47 | 46 | 45 | 43 | 41 | 44 | E2 |
| (MPa) | 62 | 59 | 59 | 59 | 49 | 30 | 44 | C2 |
| Tensile Break | 197 | 200 | 194 | 209 | 213 | 366 | 416 | E2 |

TABLE 2-continued

Blends of Example 2 (E2) and Comparative Example 2 (C2)

| | Blend | | | | | | | Example |
|---|---|---|---|---|---|---|---|---|
| | A | B | C | D | E | F | G | No. |
| Elongation (%) | 107 | 124 | 139 | 162 | 139 | 134 | 416 | C2 |
| Notched Izod at 23° C. (J/m) (⅛" bar) | x | 975 | 1044 | 1091 | 1159 | 1167 | 104 | E2 |
| | 796 | 868 | 831 | 856 | 873 | 377 | 104 | C2 |
| ¼" Bars Notched Izod at 23° C. (J/m) | 766 | 825 | 860 | 1018 | 851 | 206 | 61 | E2 |
| | 635 | 649 | 692 | 700 | 218 | 170 | 61 | C2 |
| Tg-1 (° C.) | 106.7 | 105.0 | 104.5 | 104.2 | 104.6 | 104.0 | x | E2 |
| | 144.9 | 140.7 | 138.5 | 138.8 | 136.9 | absent | x | C2 |
| Tg-2 (° C.) | x | 79.4 | 78.4 | 78.8 | 79.2 | 79.0 | 79.3 | E2 |
| | x | 79.1 | 78.7 | 79.7 | 81.4 | 80.5 | 79.3 | C2 |
| Tm (° C.) | x | absent | 241.2 | 241.6 | 242.1 | 242.5 | 242.5 | E2 |
| | x | absent | 237.7 | 237.5 | 237.9 | 239.5 | 242.5 | C2 |
| % Crystalline PET | 0.0 | 0.0 | 1.3 | 1.3 | 10.1 | 7.9 | 26.2 | E2 |
| | 0.0 | 0.0 | 1.0 | 1.2 | 2.4 | 4.2 | 26.2 | C2 |

Table 2 shows the composition and physical properties of the blends of this invention (E2)—the copolyester AAC 1 compounded with PET 2. These examples show that the higher tensile elongation at break, improvements in notched Izod toughness, increased melting temperature, and higher levels of crystallinity shown in Table 1, were also observed when a lower IV PET (0.56) was used. Blends of AAC 1 with PET 2 essentially showed similar mechanical property enhancements relative to the comparative example (C2), as were seen in the examples prepared with the higher IV PET (0.76). The E2 blends showed a general increase in notched Izod toughness with increased PET loading, up to 68.9 wt %. On the contrary, the comparative example (C2) blends showed little to no toughness enhancement as a result of the PET addition.

TABLE 3

Blends of Example 3 (E3) and Comparative Example 3 (C3)

| | Blend | | | | | | Example |
|---|---|---|---|---|---|---|---|
| | A | B | C | D | E | F | No. |
| Wt % PET 3 | 0.0 | 18.8 | 28.1 | 37.5 | 46.9 | 93.8 | |
| Wt % Polyester (AAC 1 or PC) | 93.8 | 75.0 | 65.7 | 56.3 | 46.9 | 0.0 | |
| Heat Deflection Temperature at 264 psi (° C.) | 76 | 70 | 67 | 63 | 62 | 60 | E3 |
| | 123 | 114 | 105 | 83 | 71 | 60 | C3 |
| Flexural Modulus (MPa) | 1529 | 1687 | 1730 | 1813 | 1874 | 2276 | E3 |
| | 2889 | 2307 | 2328 | 2327 | 2320 | 2276 | C3 |
| Flexural Strength (MPa) | 59 | 62 | 62 | 63 | 65 | 71 | E3 |
| | 104 | 88 | 86 | 82 | 79 | 71 | C3 |
| Tensile Strength (MPa) | 43 | 48 | 47 | 45 | 47 | 42 | E3 |
| | 67 | 65 | 61 | 61 | 59 | 42 | C3 |
| Tensile Break Elongation (%) | 125 | 199 | 203 | 186 | 275 | 415 | E3 |
| | 121 | 140 | 131 | 177 | 242 | 415 | C3 |
| Notched Izod at 23° C. (J/m) (⅛" bar) | 927 | 1053 | 1047 | 1127 | 1170 | 53 | E3 |
| | 851 | 891 | 970 | 919 | 820 | 53 | C3 |
| ¼" Bars Notched Izod at 23° C. (J/m) | x | x | x | x | x | x | E3 |
| | x | x | x | x | x | x | C3 |
| Tg-1 (° C.) | 107.2 | 105.3 | 105.0 | 105.6 | 104.5 | x | E3 |
| | 144.7 | 143.1 | 140.1 | 140.8 | 141.2 | x | C3 |
| Tg-2 (° C.) | x | 79.0 | 79.4 | 78.9 | 79.0 | 79.6 | E3 |
| | x | 78.0 | 77.6 | 78.5 | 79.5 | 79.6 | C3 |
| Tm (° C.) | x | absent | absent | 243.9 | 244.5 | 243.8 | E3 |
| | x | absent | 240.9 | 241.0 | 241.3 | 243.8 | C3 |
| % Crystalline PET | 0.0 | 0.0 | 0.0 | 5.9 | 26.0 | 17.7 | E3 |
| | 0.0 | 0.0 | 2.0 | 3.8 | 7.9 | 17.7 | C3 |

Table 3 shows the composition and physical properties of the blends of this invention (E3)—the copolyester AAC 1 compounded with PET 3. E3 demonstrates that the higher tensile elongation at break, improvements in notched Izod toughness, increased melting temperature, and higher levels of crystallinity shown in Tables 1-2, are not unique to a specific PET resin. Additionally, these blends contain only 6 wt % of the MBS impact modifier compared to 8 wt % for E1, E2, and E5. Comparing E3 to the comparative example (C3), which contains polycarbonate blends with PET 3, further confirms the superior properties exhibited by the blends of this invention.

C2, and C4) showed very irregular character for the viscosity versus time curve. While not intending to be bound by any particular theory, it appears that this erratic behavior indicates that a chemical reaction, like transesterification, may be occurring in the polycarbonate blends, creating significant

TABLE 4

Blends of Examples 4 (E4) and 6 (E6), and Comparative Example 4 (C4)

| | Blend | | | | | | Example |
|---|---|---|---|---|---|---|---|
| | A | B | C | D | E | F | No. |
| Wt % PET 4 | 0.0 | 18.8 | 28.1 | 37.5 | 46.9 | 93.8 | |
| Wt % Polyester (AAC 1, AAC 2, or PC) | 93.8 | 75.0 | 65.7 | 56.3 | 46.9 | 0.0 | |
| Heat Deflection Temperature at 264 psi (° C.) | 76 | 71 | 66 | 64 | 64 | 59 | E4 |
| | 123 | 114 | 104 | 87 | 75 | 59 | C4 |
| | 82 | 73 | x | 66 | 65 | 59 | E6 |
| Flexural Modulus (MPa) | 1529 | 1674 | 1733 | 1818 | 1908 | 2328 | E4 |
| | 2889 | 2305 | 2341 | 2291 | 2273 | 2328 | C4 |
| | 1495 | 1619 | x | 1750 | 1839 | 2328 | E6 |
| Flexural Strength (MPa) | 59 | 61 | 63 | 65 | 65 | 71 | E4 |
| | 104 | 87 | 85 | 83 | 80 | 71 | C4 |
| | 58 | 62 | x | 62 | 63 | 71 | E6 |
| Tensile Strength (MPa) | 43 | 47 | 46 | 46 | 48 | 35 | E4 |
| | 67 | 65 | 58 | 58 | 60 | 35 | C4 |
| | 44 | 48 | x | 48 | 48 | 35 | E6 |
| Tensile Break Elongation (%) | 125 | 170 | 180 | 197 | 350 | 355 | E4 |
| | 121 | 148 | 127 | 150 | 263 | 355 | C4 |
| | 112 | 147 | x | 184 | 243 | 355 | E6 |
| Notched Izod at 23° C. (J/m) )(⅛" bar) | 927 | 1001 | 1076 | 1123 | 1210 | 40 | E4 |
| | 851 | 902 | 891 | 876 | 732 | 40 | C4 |
| | 703 | 855 | x | 1004 | 1105 | 40 | E6 |
| ¼" Bars Notched Izod at 23° C. (J/m) | x | x | x | x | x | x | E4 |
| | x | x | x | x | x | x | C4 |
| | 619 | 704 | x | 614 | 520 | x | E6 |
| Tg-1 (° C.) | 107.2 | 105.2 | 105.1 | 105.8 | 106.0 | x | E4 |
| | 144.7 | 140.2 | 139.5 | 136.0 | 80.4 | x | C4 |
| | 116.5 | 113.5 | x | 112.1 | 112.7 | x | E6 |
| Tg-2 (° C.) | x | 79.4 | 79.7 | 79.2 | 79.8 | 79.9 | E4 |
| | x | 78.8 | 79.2 | 79.5 | absent | 79.9 | C4 |
| | x | 78.4 | x | 79.1 | 75.8 | 79.9 | E6 |
| Tm (° C.) | x | absent | absent | 242.9 | 243.2 | 243.2 | E4 |
| | x | absent | absent | 237.9 | absent | 243.2 | C4 |
| | x | absent | x | 245.4 | 246.1 | 243.2 | E6 |
| % Crystalline PET | 0.0 | 0.0 | 0.0 | 3.2 | 15.5 | 12.7 | E4 |
| | 0.0 | 0.0 | 0.0 | 1.2 | 0.0 | 12.7 | C4 |
| | 0.0 | 0.0 | 0.0 | 9.6 | 0.6 | 12.7 | E6 |

Finally, Table 4 shows the composition and physical properties of the blends of this invention (E4 and E6)—the copolyesters AAC 1 and AAC 2 compounded with PET 4, which has a higher IV of 0.80. Once more, both E4 and E6 generally showed the improvements in notched Izod toughness, increased melting temperature, and higher levels of crystallinity, relative to their polycarbonate counterparts (C4) prepared at the same concentration. This example demonstrates that the advantages of this invention extend to higher IV and different grade PET resins.

Figure 2:
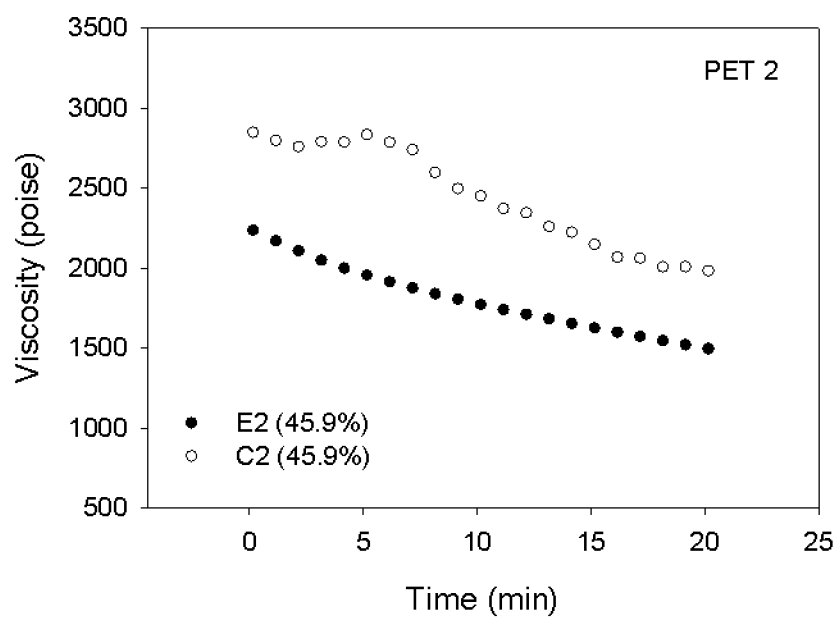
FIG. 2 is a graph of SAOS rheology as a function of time of the blends from Example 2 (E2) and Comparative Example 2 (C2) at 300° C.
Figure 3:
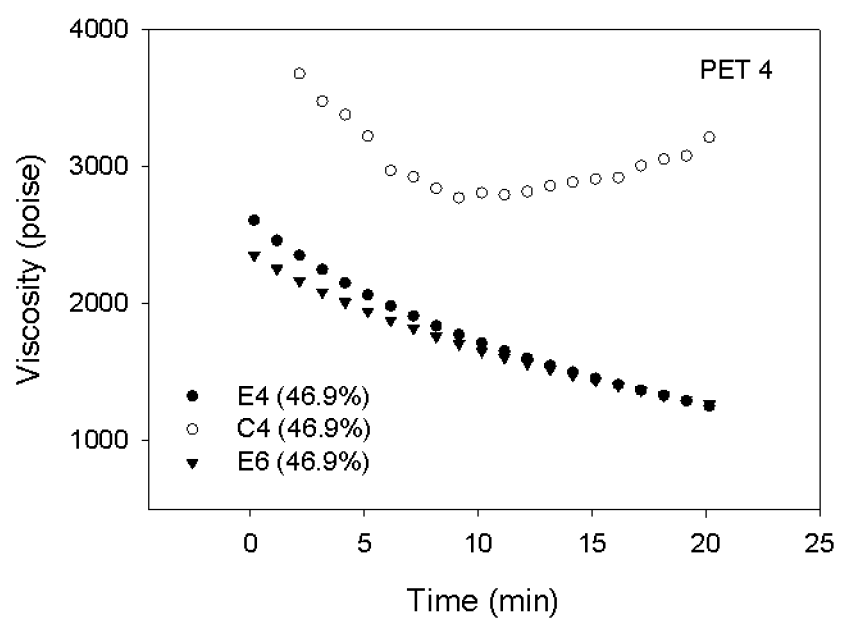
FIG. 3 is a graph of SAOS rheology as a function of time of the blends from Example 4 (E4), Comparative Example 4 (C4), and Example 6 (E6) at 300° C.

In addition to the mechanical and thermal property improvements exhibited by the blends of this invention in Tables 1-4, significant improvements were also observed regarding melt phase stability. FIGS. 1-3 show the viscosity of the molten blend at 300° C. as a function of time, for several examples and comparative examples at a 50/50 (PET/copolyester) ratio. As expected, all samples showed viscous decay, which is indicative of thermo-oxidative degradation and molecular weight breakdown of typical polyester materials at elevated temperatures. But while the examples (E1, E2, and E4-E6) of this invention showed a common monotonic decay in the rheological signature, the comparative examples (C1, melt instabilities and viscosity reduction that are not present in the blends of this invention.

TABLE 5

Measured Offgas Rates of $CO_2$ During Annealing of Blends at 300° C.

| Example No. (Blend E) | $CO_2$ Gas Evolution Rate at 300° C. (μg $CO_2$/g/min) |
|---|---|
| E1 | 5.0 |
| E2 | 5.4 |
| E3 | 3.3 |
| E4 | 2.8 |
| E5 | 3.1 |
| E6 | 1.9 |
| C1 | 95.8 |
| C2 | 107.4 |
| C3 | 118.2 |
| C4 | 119.4 |

Gas evolution experiments were conducted to analyze the presence or absence of a reaction within each blend. Carbon dioxide ($CO_2$) is a common offgas generated in polyester blends, due to the breakdown of unstable end-groups produced during reaction between the PET and polyester phases. Table 5 shows the rate of $CO_2$ generation for several systems. All of the polycarbonate comparative example blends (C1-C4) showed significant generation of carbon dioxide (96-119 $\mu g/g_{sample}$/min). Conversely, the examples of this invention (E1-E6) showed very little $CO_2$ release (3-5 $\mu g/g_{sample}$/min).

This result is reliable across the variety of PET types examined. For the examples of this invention, the offgas data suggests that very little reaction between blend components occurred. Less reaction would likely permit easier formation of the PET crystalline structure (higher melting temperatures and degree of crystallization). In contrast, the comparative example offgas data suggests that significant chemical reaction occurred. This would probably reduce the opportunity for PET to be crystallizable.

In summary, the rheological data presented in FIGS. 1-3, combined with the offgas data, confirm that blends of the copolyesters of this invention (AAC 1 and AAC 2) with PET possess much higher levels of melt-phase stability than other polyesters (PC) blended with PET. Not only does this promote higher levels of crystallinity and elevated melting temperatures, the improved melt stability offers advantages for industrial polymer processing (e.g., injection molding, extrusion, etc).

The invention has been described in detail with particular reference to preferred embodiments thereof, but it will be understood that variations and modifications can be effected within the spirit and scope of the invention.

We claim:

1. A polyester blend comprising:
   (a) 15 to 80 weight percent of a polyester (A) comprising:
      (i) a dicarboxylic acid portion comprising 90 to 100 mole percent of residues of tetephthalic acid, isophthalic acid, or both; and
      (ii) a glycol portion comprising 5 to 50 mole percent of 2,2,4,4-tetramethyl-1,3-cyclobutanediol residues and 50 to 95 mole percent of 1,4-cyclohexenedimethanol residues:
   (b) 20 to 85 weight percent of a polyester (B) comprising a polyethylene terephthaiate;
   (c) 2 to 10 weight percent of an impact modifier; and
   (d) 0 to 1 weight percent of a phosphorus stabilizer;
   wherein for each of the polyester (A) and the polyester (B), the total mole % of the dicarboxylic acid portion is 100 mole %, and the total mole % of the glycol portion is 100 mole %; and
   wherein the total weight percentage of the blend equals 100 weight percent.

2. The polyester blend according to claim 1, wherein the glycol portion of the polyester (A) comprises 15 to 50 mole percent of 2,2,4,4-tetramethyl-1,3-cyclobutanediol residues and 50 to 85 mole percent of 1,4-cyclohexanedimethanol residues.

3. The polyester blend according to claim 1, wherein the glycol portion of the polyester (A) comprises 20 to 40 mole percent of 2,2,4,4-tetramethyl-1,3-cyclobutanediol residues and 60 to 80 mole percent of 1,4-cyclohexanedimethanol residues.

4. The polyester blend according to claim 1, wherein the dicarboxylic acid portion of the polyester (A) comprises up to 10 mole percent of residues of another aromatic dicarboxylic acid, an aliphatic dicarboxylic acid, a cycloaliphatic dicarhoxylic acid, or mixtures thereof.

5. The polyester blend according to claim 1, wherein the dicarboxylic acid portion of the polyester (A) comprises 90 to 100 mole % terephthalic acid residues.

6. The polyester blend according to claim 1, wherein the glycol portion of the polyester (A) comprises up to 10 mole percent of residues of another glycol containing 2 to 16 carbon atoms.

7. The polyester blend according to claim 1, wherein the polyester (B) comprises at least 90 mole percent of terephthalic acid residues and at least 90 mole percent of ethylene glycol residues.

8. The polyester blend according to claim 1, which comprises 20 to 80 weight percent of the polyester (A) and 20 to 80 weight percent of the polyester (B).

9. The polyester blend according to claim 1, which comprises about 45 to 80 weight percent of the polyester (A) and about 20 to 55 weight percent of the polyester (B).

10. The polyester blend according to claim 1, which comprises about 15 to 70 weight percent of the polyester (A) and out 30 to 85 weight percent of the polyester (B).

11. The polyester blend according to claim 1, which comprises about 15 to 50 weight percent of the polyester (A) and about 50 to 85 weight percent of the polyester (B).

12. The polyester blend according to claim 1, wherein the impact modifier is selected from the group consisting of acrylic core-shell polymers, acrylonitrile-butadiene-styrene copolymers, methacrylate-butadiene-styrene copolymers, butyl rubbers, functional epoxy olefins, and modified polyethylenes.

13. The polyester blend according to claim 1, wherein the phosphorus stabilizer is selected from the group consisting of tris(2,4-di-tert-butylphenyl)phosphite, distearyl pentaerythritol diphosphite, trisnonylphenyl phosphate, trilauryl phosphite, and diisooctyl phosphate.

14. The polyester blend according to claim 1, which further comprises one or more additives selected from the group consisting of colorants, dyes, mold release agents, flame retardants, plasticizers, nucleating agents, light stabilizers, fillers, and reinforcing materials.

15. The polyester blend of claim 1 wherein the polyester (B) comprises recycled polyethylene terepthalate.

* * * * *